United States Patent
Leininger et al.

(10) Patent No.: US 12,415,313 B2
(45) Date of Patent: Sep. 16, 2025

(54) PRINT HEAD FOR A 3D PRINTER

(71) Applicant: Eichenauer Heizelemente GmbH & Co. KG, Kandel (DE)

(72) Inventors: Philippe Leininger, Haguenau (FR); Ulrich Schlachter, Herxheim (DE)

(73) Assignee: Eichenauer Heizelemente GmbH & Co. KG, Kandel (DE)

( * ) Notice: Subject to any disclaimer, the term of this patent is extended or adjusted under 35 U.S.C. 154(b) by 138 days.

(21) Appl. No.: 18/506,579

(22) Filed: Nov. 10, 2023

(65) Prior Publication Data
US 2024/0173916 A1    May 30, 2024

(30) Foreign Application Priority Data
Nov. 25, 2022   (DE) .................. 10 2022 131 214.3

(51) Int. Cl.
*B29C 64/209*    (2017.01)
*B29C 48/02*     (2019.01)
*B29C 64/295*    (2017.01)
*B33Y 30/00*     (2015.01)

(52) U.S. Cl.
CPC .......... *B29C 64/209* (2017.08); *B29C 64/295* (2017.08); *B33Y 30/00* (2014.12); *B29C 48/02* (2019.02)

(58) Field of Classification Search
CPC ..... B29C 64/209; B29C 64/295; B29C 48/02; B33Y 30/00
See application file for complete search history.

(56) References Cited

U.S. PATENT DOCUMENTS

| | | | |
|---|---|---|---|
| 4,236,065 A * | 11/1980 | Yashin | H05B 3/141 174/556 |
| 6,129,872 A | 10/2000 | Jang | |
| 10,131,131 B2 | 11/2018 | Batchelder et al. | |
| 2012/0018924 A1 | 1/2012 | Swanson et al. | |
| 2015/0097053 A1* | 4/2015 | Batchelder | B29C 64/209 239/135 |
| 2015/0224714 A1 | 8/2015 | Swanson et al. | |
| 2019/0118471 A1 | 4/2019 | Heiligenstein et al. | |
| 2019/0201978 A1* | 7/2019 | Oftedal | B33Y 30/00 |
| 2019/0297676 A1 | 9/2019 | Ito et al. | |
| 2019/0366628 A1 | 12/2019 | Guillory et al. | |
| 2024/0051030 A1 | 2/2024 | Sedlacek et al. | |

FOREIGN PATENT DOCUMENTS

| | | | | |
|---|---|---|---|---|
| EP | 3 476 566 A1 | 5/2019 | | |
| EP | 3 547 796 A1 | 10/2019 | | |
| EP | 3965528 A1 * | 3/2022 | ......... | B29C 64/209 |
| WO | 2016/158137 A1 | 10/2016 | | |
| WO | 2022/130269 A1 | 6/2022 | | |

* cited by examiner

*Primary Examiner* — Jerzi H Moreno Hernandez
(74) *Attorney, Agent, or Firm* — Orbit IP, LLP; Marc G. Martino

(57) ABSTRACT

A print head for a 3D printer includes a nozzle for dispensing molten material. A pipe is connected to the nozzle and carrying a heating resistor layer. The pipe is seated in an annular bracket. Spring contacts are mounted on the bracket, which contacts bear against the pipe at mutually opposite points and contact the heating resistor layer.

17 Claims, 6 Drawing Sheets

PRINT HEAD FOR A 3D PRINTER

CROSS-REFERENCE TO RELATED APPLICATIONS

This application claims priority to German Patent Application No. DE 10 2022 131 214.3 filed Nov. 25, 2022, the entire contents of which are hereby incorporated in full by this reference.

DESCRIPTION

Field of the Invention

The invention relates to a print head for a 3D printer. A print head with the features indicated in the preamble of claim 1 is known from EP 3 965 528 A1.

Background of the Invention 3D printers enable quick and easy production of prototypes or pre-series visualisation models. Various 3D printing processes are currently in use. The present invention relates to a print head for a 3D printer, with which molten plastic is applied layer by layer and thus a three-dimensional object is produced. The plastic can also contain additives such as metal, ceramics, graphite or carbon fibres.

Print heads with a pipe carrying a heating resistor layer enable plastic material to be melted very quickly so that printing can be started quickly because a pipe with a heating resistor layer has an advantageously low heat capacity. An advantageously low heat capacity also means that the pipe cools quickly at the end of a printing process or when a printing process is interrupted, resulting in less dripping of liquid material from the nozzle. Less dripping allows for greater precision in printing.

A constant goal in the development of print heads for 3D printers is to facilitate printing three-dimensional objects as quickly as possible, which is why the general aim is to heat them up as quickly as possible.

SUMMARY OF THE INVENTION

An object of the present invention is to show a way to heat up the pipe of a print head for a 3D printer even faster.

This object is achieved by a print head with the features indicated in claim 1. Advantageous refinements of the invention are the subject of dependent claims.

By placing the pipe of the print head in an annular bracket and mounting spring contacts on the bracket, which are in contact with the pipe at opposite points and contact the heating resistor layer, heating current can flow over practically the entire circumference of the pipe. This is because the two opposing spring contacts are connected in parallel by the heating resistor layer, since heating current can flow from one spring contact to the opposing spring contact over two different circumferential halves each. The pipe of a print head according to the invention can thus be heated over a larger part of its circumference or even over its entire circumference, which enables faster heating than a heating layer covering only part of the circumference, for example in the form of conductor tracks.

The heating resistor layer may surround the pipe over its entire full circumference. For manufacturing reasons, it can be advantageous that a longitudinal gap remains in the heating layer. This longitudinal gap may be bridged by a conductor strip so that the entire circumference can still be utilised.

The heating resistor layer may be applied directly to the pipe or to an intermediate layer. The heating resistor layer may, for example, be printed on, sprayed on or deposited from the gas phase. Heating layers that are initially applied as a liquid or paste and then solidified by exposure to temperature are often referred to as thick film resistors. Such heating resistor layers can, for example, be based on ruthenium dioxide, Ag, graphite, carbon nanotubes, or other conductive materials. Heating resistor layers can also be deposited from the gas phase, for example by means of cathode sputtering. Such heating resistor layers are often referred to as thin-film resistors and can, for example, be based on nickel and/or chromium.

For example, the heating resistor layer may be applied to the pipe over almost the entire surface, whereby only a gap may remain due to manufacturing reasons. A conductor track applied subsequently (or previously) may then cover the gap so that no gap remains on the circumference.

Thereafter, a cover layer may be applied to protect and insulate the heating element, which only leaves recesses in the area of the contacts. The cover layer can, for example, be an amorphous layer or a glass-like layer, i.e., a layer that contains crystalline components in addition to amorphous components.

An advantageous refinement of the invention provides that the pipe and the nozzle are manufactured in one piece. Although the pipe and nozzle can also be manufactured separately and connected during assembly, manufacturing and assembly costs can be reduced and better heat distribution achieved with production as a single piece.

A further refinement of the invention provides that the nozzle and the pipe are made of ceramic, for example an aluminium oxide ceramic. The nozzle and pipe can, for example, be manufactured in one piece from powder by sintering, in particular in combination with an injection moulding process or 3D printing process. Alternatively, the pipe and nozzle can also be made of metal, in particular steel. In the case of a metal pipe, the heating layer may be applied to an electrically insulating intermediate layer. An intermediate layer can also be provided to improve the adhesion of the heating layer to a ceramic pipe.

A further refinement of the invention provides that the annular bracket is materially connected to the pipe. For example, the pipe can be inserted into the ring-shaped bracket and then soldered or glued to it, for example with an adhesive based on aluminium oxide, potassium silicate and water.

A further refinement of the invention provides that the bracket is made of steatite or an aluminium oxide ceramic. Steatite has a relatively low heat capacity and a comparatively low thermal conductivity. Moreover, steatite allows inexpensive manufacturing by pressing.

Preferably, the bracket has a receptacle for an adhesive or a brazing alloy on its underside facing the nozzle. In this way, the adhesive or brazing alloy can be well dosed and distributed. The receptacle for an adhesive or a brazing alloy may be designed as a radial and/or axial recess, for example as a recess, ramp, groove or annular shoulder.

The bracket may be connected axially to the pipe in the area of the heating layer. Surprisingly, it has been shown that this is possible without impairing the heating element. Preferably, the bracket is connected to the cover layer by a material bond.

A further refinement of the invention provides that the pipe carries a heat protection pipe at its end facing away from the nozzle. The heat protection pipe extends the pipe and thermally decouples it from other parts of a 3D printer. The heat protection pipe may be bonded, for example glued, to the pipe. For example, the heat protection pipe may be made of a metal that has low thermal conductivity and good mechanical strength, such as titanium. In other embodiments the heat protection pipe may be made of ceramic, for example a zirconium oxide ceramic. Zirconium oxide ceramics have an advantageously low thermal conductivity and a high abrasion resistance.

To achieve a good connection strength, the pipe may be inserted into the heat shield or the heat shield into the pipe. In this way a larger connection area can be achieved than with components that are only butt-jointed. For example, the connection may be made by gluing or brazing. An adhesive or brazing gap may be arranged between the heat protection and the pipe to accommodate the connecting material, i.e., brazing material, solder, or adhesive. The pipe and the heat shield can, for example, have conical end sections with which they are inserted into each other.

For temperature monitoring, a temperature sensor, for example a measuring resistor such as a PT100, may be applied to the pipe, in particular in the area of the heating resistor layer. In some embodiments, the sensor may also be held by the ring-shaped bracket. A spring plate may also be attached to the bracket, which resiliently presses the sensor against the pipe. In an embodiment of the invention, the bracket may have a projection for this purpose, which is elastically embraced by the tabs of the spring plate. In addition, the sensor may be glued to the pipe.

BRIEF DESCRIPTION OF THE DRAWINGS

Further details and advantages of the invention are explained by means of an illustrative embodiment with reference to the enclosed drawings. Identical and corresponding components are marked with matching reference signs. The figures are as follows.

DETAILED DESCRIPTION OF EMBODIMENTS OF THE INVENTION

Figure 1:
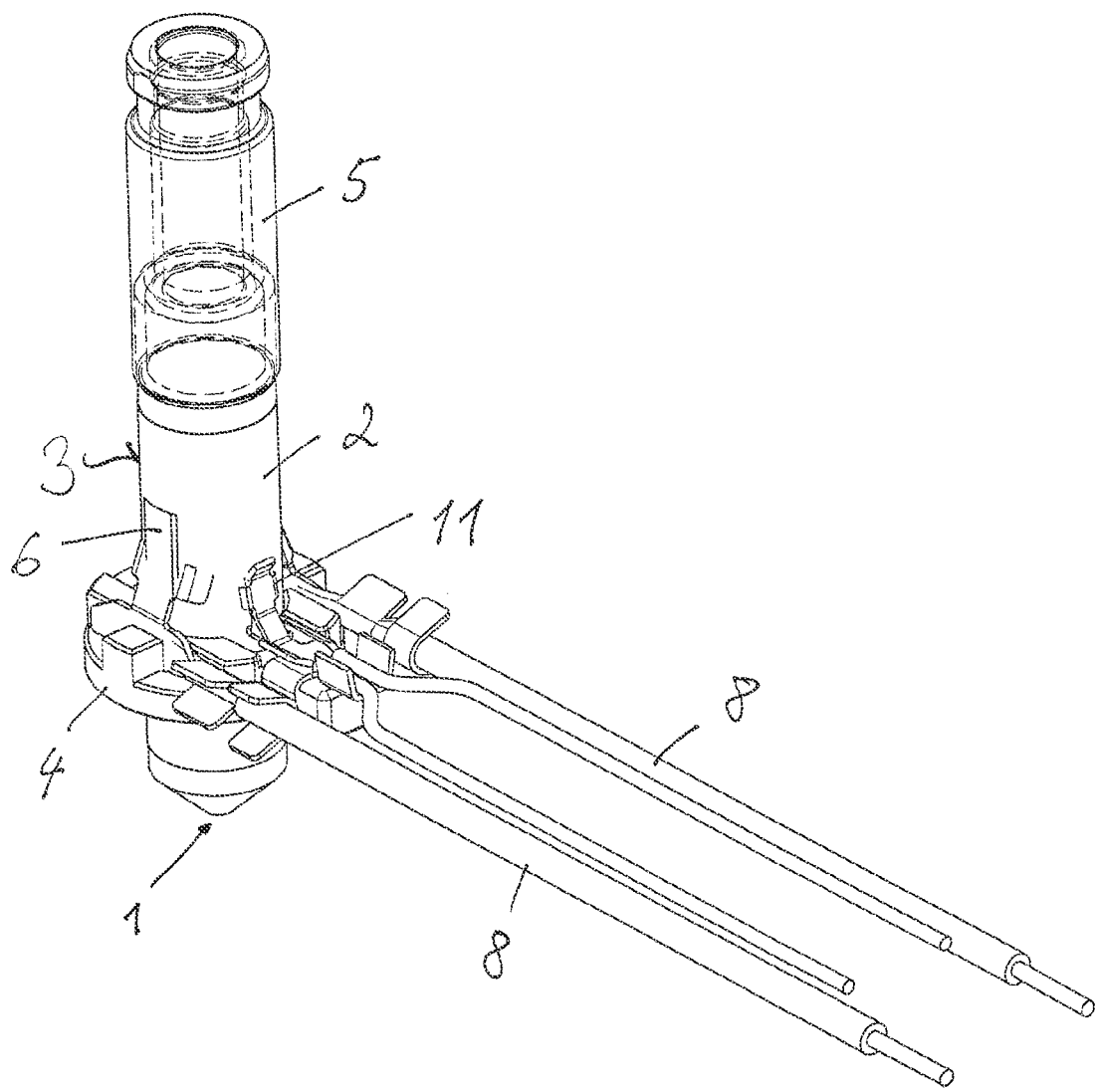
FIG. 1 shows an example of a print head for a 3D printer according to the invention.

The print head for a 3D printer shown in the figures has a nozzle 1 for dispensing molten plastic material, a pipe 2 connected to the nozzle 1 and carrying a heating resistor layer 3, an annular bracket 4 in which the pipe 2 is seated, and a heat protection pipe 5 attached to the end of the pipe 2 carrying the heating resistor layer 3 remote from the nozzle 1.

The nozzle 1 and the pipe 2 connected to it, which carries the heating resistor layer 3, may be manufactured in one piece, for example from an aluminium oxide ceramic. Alumina ceramics have high abrasion resistance and good thermal conductivity so that heat generated by the heating resistor layer 3 can be quickly transferred to material to be melted in the pipe 2. To reduce heat loss by thermal conduction, the pipe 2 provided with the resistive resistor layer 3 carries at its end facing away from the nozzle 1 a heat protection pipe 5 made of a material having a lower thermal conductivity than the pipe 2, in particular, having a lower thermal conductivity than alumina ceramic. Suitable materials for the heat protection pipe 5 are for example titanium and in particular zirconium oxide ceramics. The heat protection pipe 5 can be materially connected to the pipe 2 carrying the heating resistor layer 3, for example by brazing or an adhesive.

Figure 4:
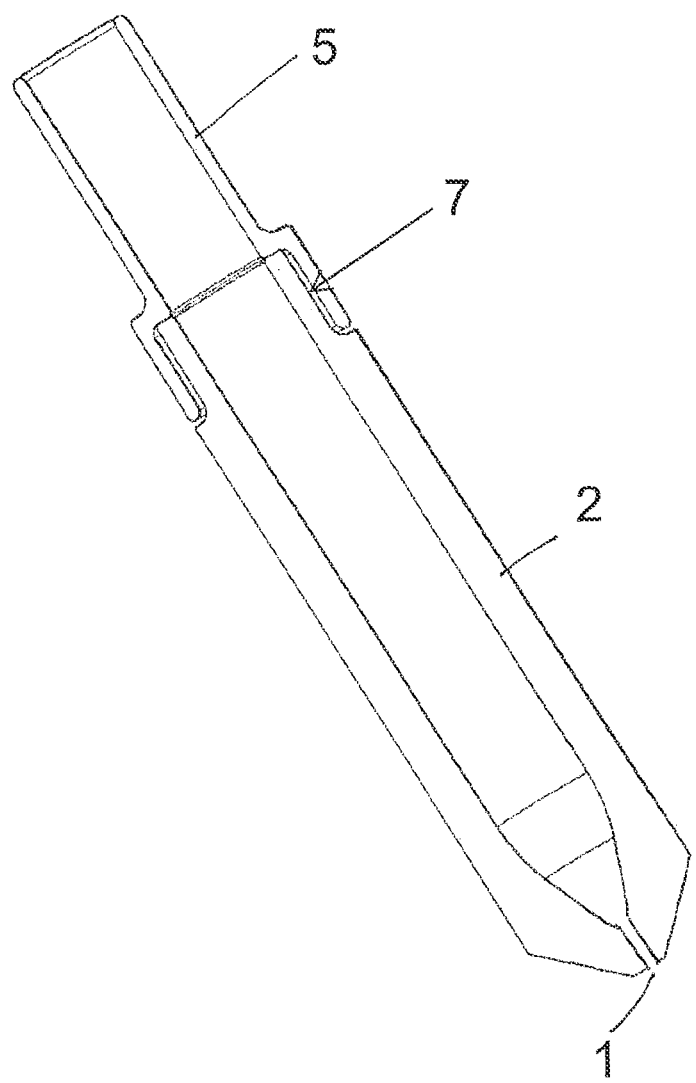
FIG. 4 shows a schematic sectional view of the pipe and heat protection pipe of the print head.

The heat protection pipe 5 and the pipe 2 carrying the heating resistance layer 3 may be inserted into each other, as shown schematically in FIG. 4. In this way, the contact surface between the heat protection pipe 5 and the pipe 2 carrying the heating resistance layer 3 can be increased, which facilitates a material connection. Both the heat protection pipe 5 and the pipe 2 carrying the heating resistance layer 3 can be provided with a conical end section for this purpose, which facilitates insertion into one another. In FIG. 4 the pipe 2 carrying the heating resistance layer 3 is inserted into the heat protection pipe 5. Alternatively, the heat protection pipe 5 can also be inserted into the pipe 2 carrying the heating resistance layer 3. A remaining gap 7 between the pipe 2 and the heat protection pipe 5 may be filled with adhesive or brazing alloy.

The pipe 2 carrying the heating resistor layer 3 is seated in the ring-shaped bracket 4, on which spring contacts 6 are mounted, which bear against a circumferential surface of the pipe 2 at opposite points under pretension and thus make electrical contact with the heating resistor layer 3. The pipe 2 connected to the nozzle 1 can therefore be covered over its entire circumference by the heating resistor layer 3. In the embodiment shown, the spring contacts 6 are stamped and bent sheet metal parts which may be crimped or otherwise connected to electrical connection lines 8.

The heating resistor layer 3 may be applied, for example, by deposition from the gas phase or also by spraying or printing. The heating resistance layer 3 can be applied directly to the pipe 2 or to an intermediate layer, for example to improve adhesion.

Figure 3:
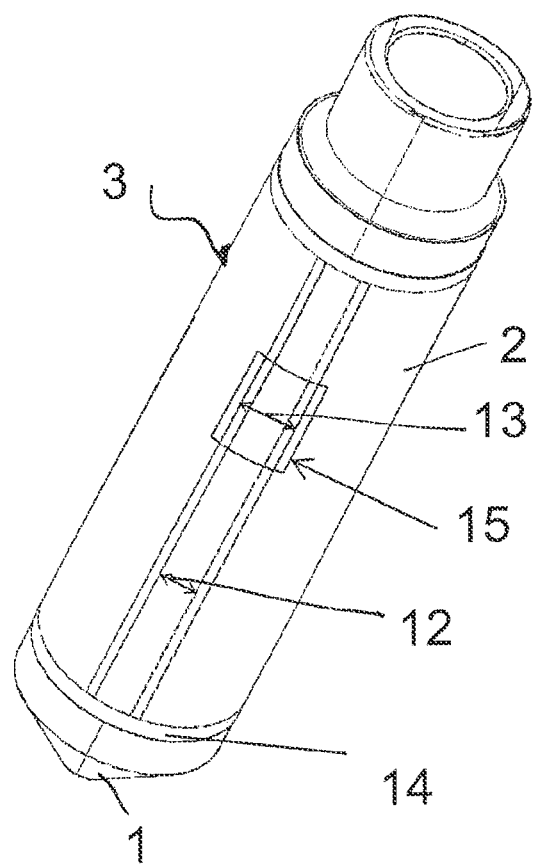
FIG. 3 shows an example of the pipe with the nozzle of the print head.

The heating resistor layer 3 may cover the pipe 2 over its entire circumference or—as shown schematically in FIG. 3—leave a narrow longitudinal strip 12 uncovered. This longitudinal strip 12 may be bridged by a conductive layer 13 so that the full circumference can still be used for a heating current.

The ring-shaped bracket 4 may be connected to the pipe 2 with a material bond, for example by brazing or gluing. Bonding with an adhesive based on aluminium oxide and potassium silicate is particularly suitable. Such an adhesive may be applied as an aqueous mixture and then cured in one or more steps by drying and exposure to temperature. The bracket 4 surrounds a portion of the pipe 2 which is covered by the heating resistor layer 3. The heating resistor layer 3 may be protected from damage by an electrically insulating cover layer 14. The bracket 4 may be bonded or soldered to the cover layer 14, especially bonded or soldered to the cover layer 14 at the axial height of the heating resistance layer 3. This enables a large heating resistor surface in combination with a small installation space. The cover layer 14 has recesses 15 in which the spring contacts 6 rest against the conductive layers 13, and can consist of an amorphous or glass-like material, for example.

Figure 2:
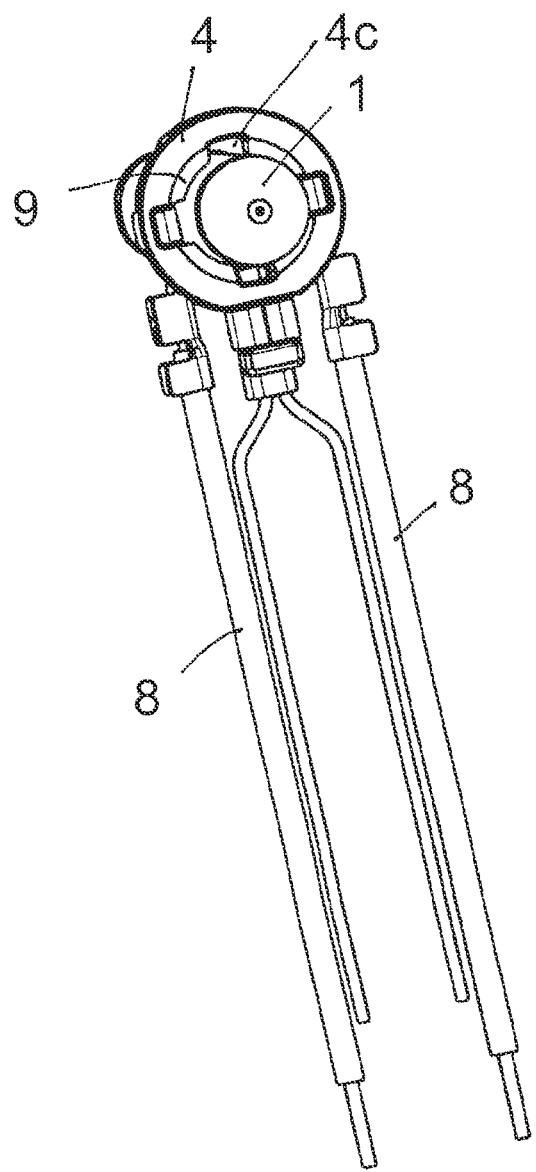
FIG. 2 shows another view of the print head viewed from below at its outlet opening.
Figure 5:
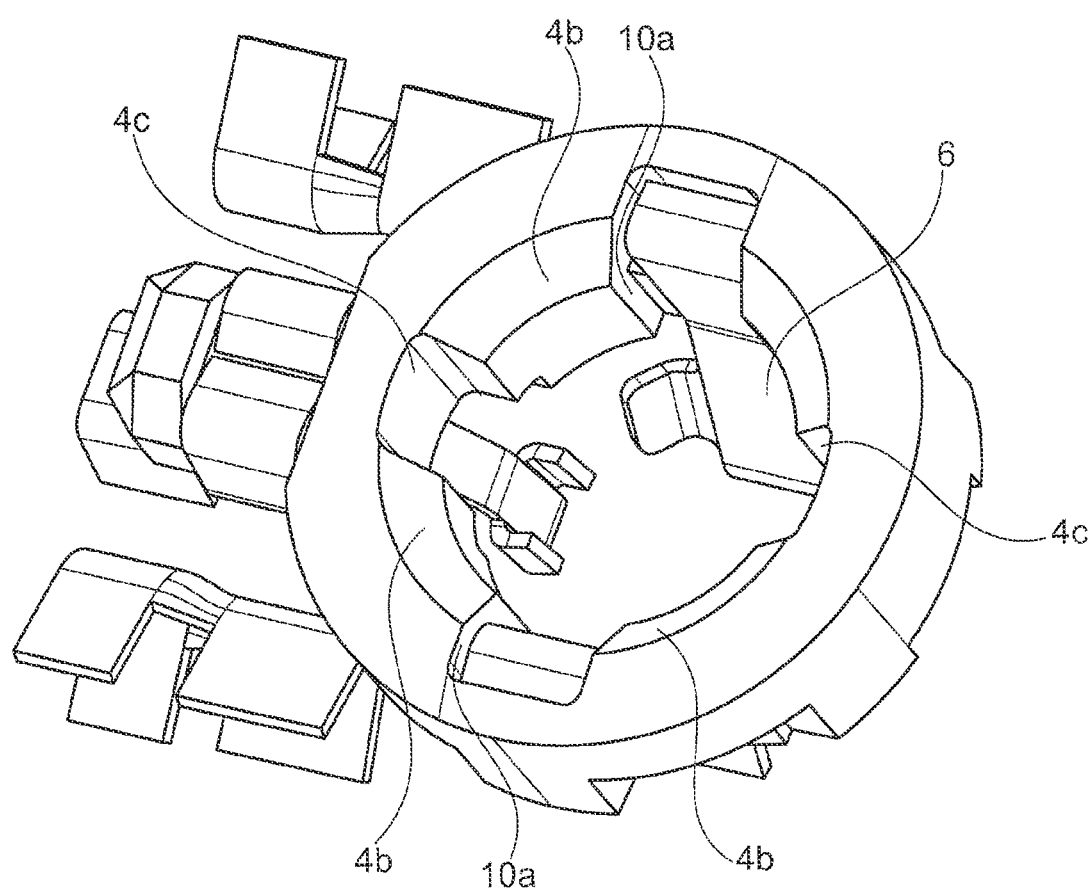
FIG. 5 shows a bottom view of the print head support and spring contacts.
Figure 6:
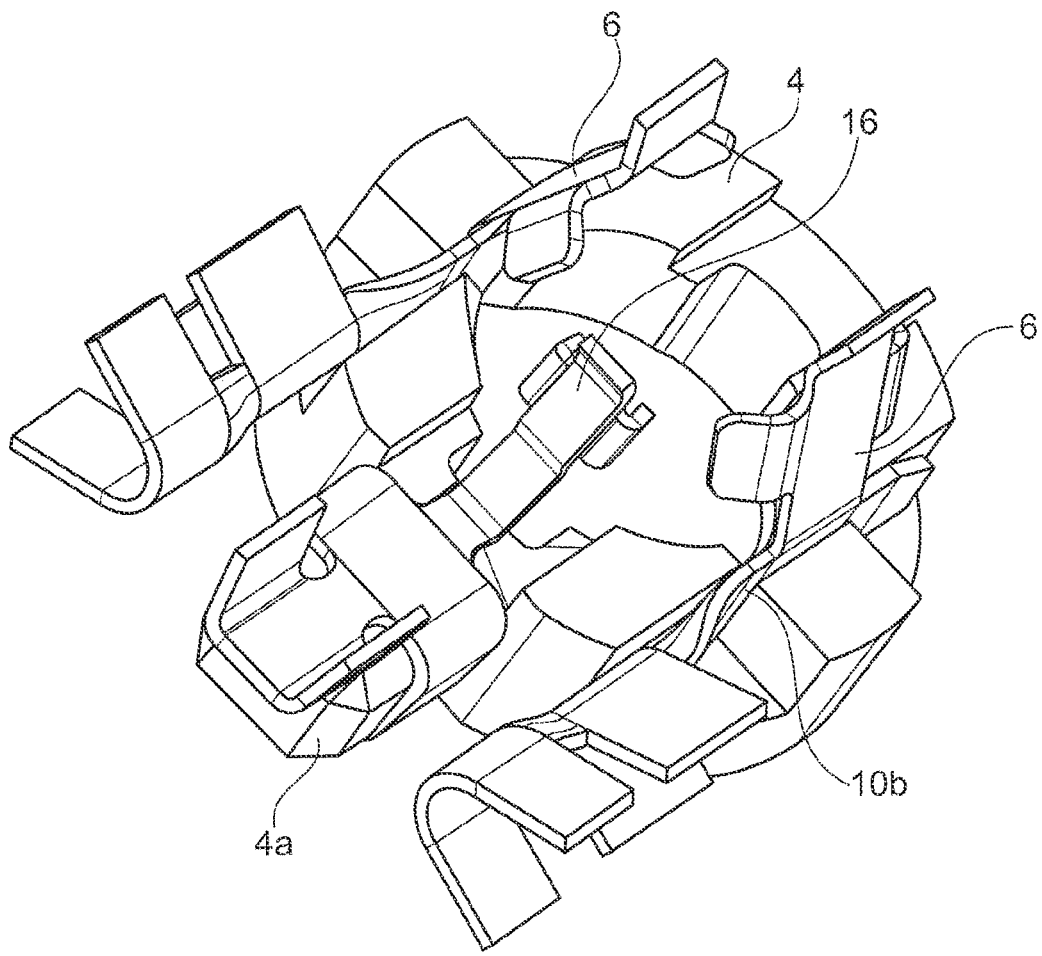
FIG. 6 shows a top view of the bracket and spring contacts of the print head.

FIG. 2 shows a detailed view of the print head seen from below at the outlet opening of the nozzle 1. FIG. 5 shows a corresponding view of the bracket 4 with the spring contacts 6 from below, i.e., as seen from the nozzle 1, and FIG. 6 shows the bracket 4 with the spring contacts 6 from above. As can be seen, in particular, in FIG. 5, the bracket 4 has an annular ramp 4b on its underside. Together with the pipe 2 inserted into the bracket 4, the ramp 4b forms a groove 9 which may be filled with brazing alloy or adhesive to create a mechanically reliable contact between the pipe 2 and the bracket 4. Alternatively or additionally, recesses 4c may serve to receive the adhesive. The bracket 4 may further comprise recesses 10a and/or slots 10b extending in the axial direction of the pipe 2. Stamped bending parts forming the spring contacts 6 can engage in these recesses 10a and/or slots 10b and thus improve the mechanical contact.

A temperature sensor 11, for example a measuring resistor, can be connected to the pipe 2 for temperature monitoring. The sensor is also held by the ring-shaped bracket 4. For this purpose, a spring plate 16 is attached to the bracket, which resiliently presses the sensor 11 against the pipe 2. In an embodiment, the bracket 4 may have a projection 4a for this purpose, which is elastically embraced by tabs of the spring plate 16. In addition, the sensor can be glued to the pipe.

The size of the described print head can be chosen practically arbitrarily according to the requirements of a given 3D printer. As a rule, the pipe 2 together with the nozzle has a length of 1 cm to 3 cm, in particular 1.5 cm to 2.5 cm, and a diameter of 0.4 cm to 0.8 cm.

LIST OF REFERENCE SIGNS

1 Nozzle
2 Pipe
3 Heating resistor layer
4 Bracket
4a Projection
4b Ramp
4c Recess
5 Heat protection pipe
6 Spring contacts
8 Connection cable
9 Groove
10a Recess
10b Slot
11 Temperature sensor
12 Longitudinal strips
13 Conductive layer
14 Cover layer
15 Recess
16 Spring plate

What is claimed is:

1. A print head for a 3D printer, comprising:
a nozzle for dispensing molten material;
a pipe connected to the nozzle and carrying a heating resistor layer;
wherein the pipe is seated in an annular bracket; and
spring contacts are mounted on the bracket, which press against the pipe at opposite points and contact the heating resistor layer;
wherein the spring contacts are stamped and bent sheet metal parts and configured to be connected to electrical connection lines.

2. The print head according to claim 1, wherein the heating resistor layer is a sprayed layer, a printed layer or a gas deposition layer.

3. The print head according to claim 1, wherein the nozzle and the pipe are made of an aluminium oxide ceramic.

4. The print head according to claim 1, wherein the bracket is connected to the pipe by a braze.

5. The print head according to claim 1, wherein the pipe is connected to the bracket by an adhesive.

6. The print head according to claim 5, wherein the adhesive is based on aluminium oxide and potassium silicate.

7. The print head according to claim 5, wherein the bracket has a recess which together with the pipe forms a receptacle for the adhesive.

8. The print head according to claim 7, wherein the recess forms an annular groove together with the pipe.

9. The print head according to claim 8, wherein, the groove is on an underside of the bracket, said underside facing the nozzle.

10. The print head according to claim 1, wherein the bracket is made of steatite.

11. The print head according to claim 1, wherein the pipe carries a heat protection pipe at its end facing away from the nozzle.

12. The print head according to claim 11, wherein the heat protection pipe is made of a zirconium oxide ceramic.

13. The print head according to claim 1, wherein the bracket surrounds a portion of the pipe covered by the heating resistor layer.

14. The print head according to claim 1, wherein the heating resistor layer is covered by a cover layer which has at least one recess in which a spring contact is electrical conduction with the heating resistor layer or a conductive layer that is then in electrical conduction with the heating resistor layer.

15. The print head according to claim 14, wherein, the cover layer is an amorphous or glass-like cover layer.

16. A print head for a 3D printer, comprising:
a nozzle for dispensing molten material;
a pipe connected to the nozzle and carrying a heating resistor layer;
wherein the pipe is seated in an annular bracket; and
spring contacts are mounted on the bracket, which press against the pipe at opposite points and contact the heating resistor layer;
wherein the pipe is connected to the bracket by an adhesive, where the adhesive is based on aluminium oxide and potassium silicate.

17. A print head for a 3D printer, comprising:
a nozzle for dispensing molten material;
a pipe connected to the nozzle and carrying a heating resistor layer;
wherein the pipe is seated in an annular bracket;
wherein the annular bracket comprises an annular ramp on an underside of the annular bracket;
wherein the annular ramp and the pipe cooperatively form a groove when the pipe is seated in the annular bracket;
wherein a braze or an adhesive is disposed within the groove forming a mechanically contact between the pipe and the annular bracket; and
spring contacts are mounted on the bracket, which press against the pipe at opposite points and contact the heating resistor layer;
wherein the spring contacts are stamped and bent sheet metal parts and configured to be connected to electrical connection lines.

* * * * *